United States Patent [19]

Slavin

[11] Patent Number: 5,584,103
[45] Date of Patent: Dec. 17, 1996

[54] BANDING AND LABELING DEVICE

[76] Inventor: Diane E. Slavin, 431 Prestwick La., Palm Beach Gardens, Fla. 33418

[21] Appl. No.: 504,909

[22] Filed: Jul. 20, 1995

[51] Int. Cl.$^6$ .............................. B65D 63/00; G09F 3/00
[52] U.S. Cl. ........................ 24/16 R; 24/30.5 S; 40/645
[58] Field of Search ............................ 24/16 R, 30.5 S; 40/633, 645; 292/325

[56] References Cited

U.S. PATENT DOCUMENTS

| | | | |
|---|---|---|---|
| 2,012,990 | 9/1935 | Choate | 40/645 |
| 2,014,723 | 9/1935 | Di Carlo | 24/546 |
| 2,799,953 | 7/1957 | Sage | 40/645 |
| 2,954,621 | 10/1960 | Mosher, Jr. et al. | 40/633 |
| 5,092,067 | 3/1992 | Prout | 224/219 |
| 5,167,086 | 12/1992 | Fast | 40/645 |

FOREIGN PATENT DOCUMENTS

| | | | |
|---|---|---|---|
| 0639495 | 4/1962 | Canada | 40/645 |
| 0007663 | of 1909 | United Kingdom | 40/645 |

Primary Examiner—Victor N. Sakran

[57] ABSTRACT

The instant invention is a reusable plastic banding strap for use in securing items in a rolled position. The device exerts only minimal pressure on the rolled items to prevent wrinkling of fragile items and further provides an area for placement of indicia so as to describe the contents of the secured rolled materials. Provisions are further made for placement of indicia within a plastic sleeve for ease of replacement when the device is used for securing items of a temporary nature.

8 Claims, 1 Drawing Sheet

BANDING AND LABELING DEVICE

FIELD OF THE INVENTION

This invention relates to storing rolled materials and, more particularly, to a reusable device for securing an item, such as a blueprint, in a rolled position with provisions for labeling the contents of the rolled item.

BACKGROUND OF THE INVENTION

There are numerous items which need to be transported or stored in a rolled position. Such items are typically of a size and thickness that makes it impractical to transport or store the items in a flat position thereby necessitating a rolled position. For example, navigation maps must be of a size capable of encompassing a large expanse of area; folding of such maps would lead to erroneous readings, for measurements must be taken directly from the map, not to mention the fold lines lead to early deterioration of the map. In addition, if a navigation map is used in smaller vessels, the map may be coated for protection which prohibits folding of the map.

Another example is blueprints used by engineers, architects, builders, and so forth to rely calculated measurements to individuals who construct from the prints. The blueprints must be of a size that is readily readable thus typically making it difficult to transport in a flat position. For this reason, blueprints are commonly transported in a rolled position and maintained in that storage position by the use of rubber bands, tape, and the like banding items.

A problem arises in the use of banding material which is not acceptable to the particular item. A rubber band has universal applications and may be used for securing an item in a rolled position. However it is well known that rubber bands come in all different shapes, sizes, and biasing ability. A rubber band will not maintain the item in a tightly secured position making it susceptible to damage. A small rubber band may wrinkle or rip the rolled item resulting in irreparable damage; if a rubber band is simply doubled over, the item may be damaged if the band does not clear an end of the rolled material.

Even if a rubber band is successfully used to band an item in a rolled position, a need may exist to undo the rolled item in order to determine the contents. External markings may define the contents but involves the use of marking directly on the material. Tape may be placed over the item but requires adhesive which is likely to yellow under UV exposure.

One known device capable of maintaining materials in a rolled position is an encapsulated cylindrical container in which placement of items in the container maintains them in a rolled position. The container allows outside marking as to the contents. The use of such containers does not eliminate the need for banding of the items that are rolled up and placed within the container. For instance, if a blueprint is placed within a cylindrical container and not previously banded it will unroll and engage the side walls of the container making it nearly impossible to remove. In addition, in many instances the container is sized sufficiently that multiple rolls may be placed therein and the markings on the outside of the container may only describe what is in the container and not particularly describe which item is in the roll requiring an individual to not only remove the items that are rolled inside but further unroll them so as to determine which item they are searching for. Thus, the problem remains that the inability to determine what each roll contains and the necessity for banding individual items placed within the cylindrical container is not eliminated.

Therefore, what is needed in the art is a device for securing items in a rolled position having the ability to accommodate various sized items as well as include a provision for labeling the rolled item for instant reference.

SUMMARY OF THE INVENTION

The instant invention is an elongated piece of material that maintains a coiled position. The preferred material is flexible plastic capable of maintaining memory of the coiled position. The device is formed in the shape of a T-strip with an elongated length having one end which includes a means for placing indicia and a second end accessible by uncoiling of the device.

The device is uncoiled and placed around an item such as a map rolled into a cylindrical shape. Upon placement, the device attempts to return to its coiled state thereby providing a frictional engagement with the rolled item to maintain the item in the pre-defined cylindrical shape. The first end of the device is available for placement of indicia thereon and may be used indefinitely by removal of the indicia when the device is used for various other materials.

This device is suitable for use with all sorts of rolled materials not limited to maps and blueprints but may be further used for extremely fragile rolled materials. For example, birthday wrapping paper may be stored for a year or more after its initial use. Any attempt to use a rubber band on the fragile paper will result in premature tearing of the paper as a rubber band has a limited width and operates as a knife should any pull on the paper occur. The use of tape on fragile paper may damage the paper when the adhesive hardens making it nearly impossible to remove without tearing the paper. In this usage the instant invention has a particular advantage as there is no permanent securement by use of adhesive and a wide width of the device distributes the pressure over a range of the material thereby lessening or eliminating the possibility of tearing the fragile material.

Thus, an objective of the instant invention is to provide an inexpensive device capable of securing items in a rolled position providing sufficient pressure to the items to maintain them in a rolled position and further provide a surface for labeling the contents of the rolled items.

Yet another objective of the instant invention is to disclose a banding material having a memory of a coiled position thereby providing a device that can be easily packaged or stored when not in use.

Still another objective of the instant invention is to provide a labeling means that does not permanently attach to rolled items with provisions for insertion of external indicia by use of a clear plastic pocket.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE PREFERRED EMBODIMENT

Although the invention will be described in terms of a specific embodiment, it will be readily apparent to those skilled in the art that various modifications, rearrangements and substitutions can be made without departing from the spirit of the invention. The scope of the invention is defined by the claims appended hereto.

Figure 1:
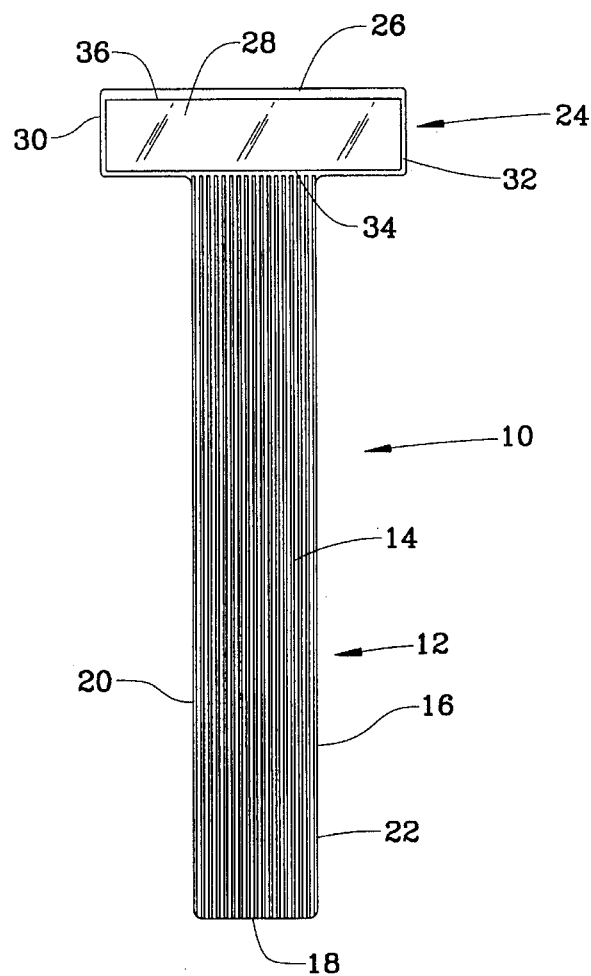
FIG. 1 is a front plane view of the instant invention in an uncoiled state.

Now referring to FIG. 1, set forth is a front plane view of the banding device 10 which consists of a lower portion 12 having a frontal surface 14, rear surface 16, lower edge 18, and opposing side edges 20 and 22. An upper section 24 of the device includes an enlarged width forming a T-shape with provisions for placement of indicia on a frontal surface 26 allowing writing thereon. In addition, a clear plastic cover 28 may be secured to the frontal surface 26 which allows for placement of independent indicia by forming a sleeve as the cover 28 is attached along side edge 30, 32 and lower edge 34. The upper edge 36 remains unsecured allowing for the placement of indicia therein. The plastic cover is attached to the structure by use of an adhesive or heat seal, removal of the cover allows for a permanent type marking such as that provided by writing directly onto surface 26, the surface may be covered with a marking tape.

Lower section 12 is constructed of a resilient flexible plastic or the like material capable of maintaining memory of a coiled position. Plastic has been found more suitable than metal so as to provide a lightweight device made of extremely thin material which, when made from metal, may subject the user to injury. The upper portion 24 of the device is heat treated or relies upon thicker material so as to prevent coiling allowing the indicia to remain flat to produce an optimum viewing surface. As will be noted later in this specification, upper portion 24 is susceptible to a minor amount of coiling which allows placement against rolled materials although it is further noted that the amount of coiling is less than the lower portion so as to prevent accidental loss of indicia placed therein.

Figure 2:
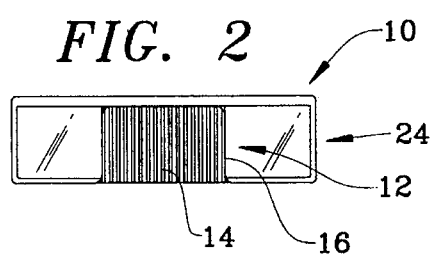
FIG. 2 is a front plane view of the instant invention in a coiled position.
Figure 3:
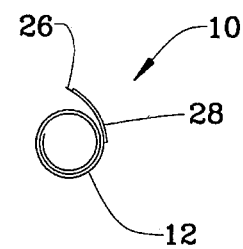
FIG. 3 is a side view of FIG. 2.

Now referring to FIGS. 2 & 3, a coiled embodiment of the device 10 is shown which further illustrates the compactness of the devices for purposes of packaging or storage until actual usage is necessary. The upper portion 24 is shown in position for receipt of indicia with the lower section 12 coiled behind the frontal surface of the device. The cover 28 and frontal surface 26 with lower portion 12 is in a coiled state which allows an individual to place indicia in the cover 28 or remove the cover for placement of indicia directly on frontal surface 26 before actual placement around a rolled material.

Figure 5:
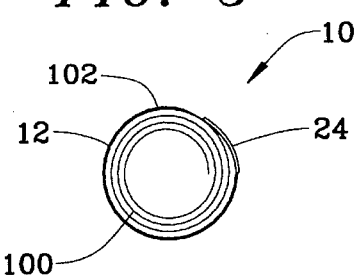
FIG. 5 is a cross-sectional side view of FIG. 4 illustrating the instant invention engagement of a rolled material.
Figure 4:
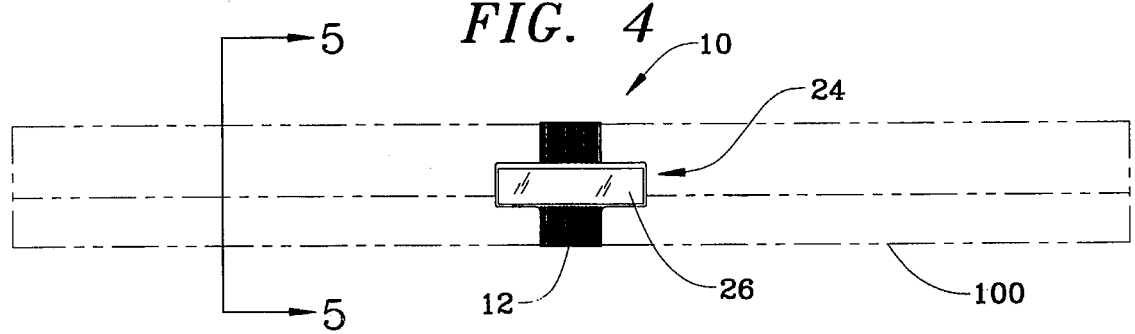
FIG. 4 is a pictorial of the instant invention secured to a rolled material.

FIG. 4 is a pictorial of a navigation map 100 having the device 10 holding the navigation map in a rolled position with upper portion 24 displaying indicia on surface 26. Lower portion 12 wraps around the surface of the navigation map 100 preventing the navigation map from unrolling. As shown in the side view of FIG. 4 through the use of FIG. 5 the device 10 tightly secures the navigation roll 100 with indicia section 24 in a frontal position for display of indicia with lower portion 12 wrapping around the navigation roll and securing a free end 102 of the navigation roll thereby preventing unraveling of the navigation roll.

It is to be understood that while I have illustrated and described certain forms of my invention, it is not to be limited to the specific forms or arrangement of parts herein described and shown. It will be apparent to those skilled in the art that various changes may be made without departing from the scope of the invention and the invention is not to be considered limited to what is shown in the drawings and described in the specification.

What I claim is:

1. A banding device for use in securing flexible items such as blueprints and maps in a rolled storage position, said device comprising:

a support member constructed from a single piece of flexible self coiling material, said support member having a rectangular shape with a length and a width and a frontal surface separated from a rear surface defining a uniform nominal thickness therebetween, said width delineated by opposing side edges coiling in a parallel plane with said rear surface available for placement of identifying indicia thereon, whereby uncoiling said support member means allows for insertion of a rolled item to be stored in a rolled position against said frontal surface, said rolled item is maintained in a rolled position upon said support member returning to its normally coiled position.

2. The banding device according to claim 1 wherein said placement of indicia includes a transparent rectangular plastic holder secured to said rear surface and formed by a sleeve in conjunction with said second surface for placement of removable indicia therein.

3. The banding device according to claim 1 wherein said material is plastic.

4. The banding device according to claim 1 wherein said placement of indicia includes markable tape secured to an end portion of said second side surface.

5. The banding device according to claim 1 wherein an end portion of said member means is enlarged forming a T-shape.

6. A banding device for use in securing flexible items such as blueprints and maps in a rolled storage position, said device comprising:

a support member constructed from a single piece of flexible t-shaped self coiling plastic material, said support member further defined by upper portion and lower portion, said upper portion having a rectangular shape defined by a length and a width formed integral to a lower portion having a rectangular shape with a length and a width perpendicular to said upper portion, said support member having a frontal surface separated from a rear surface defining a uniform nominal thickness therebetween with opposing side edges of said lower portion coiling in a parallel plane;

and a means for displaying indicia along said rear side surface of said upper portion;

whereby uncoiling said support member means allows for insertion of a rolled item to be stored in a rolled position against said frontal surface, said rolled item is maintained in a rolled position upon said support member returning to its normally coiled position.

7. The banding device according to claim 6 wherein said means for displaying includes a transparent rectangular piece of plastic, said plastic having an upper edge and two side edges secured to said second surface providing a sleeve in conjunction with said second surface for placement of indicia therein.

8. The banding device according to claim 6 wherein said means for displaying is defined as a markable tape secured to an end portion of said second side surface.

\* \* \* \* \*